US006620892B1

(12) United States Patent
Bertin et al.

(10) Patent No.: US 6,620,892 B1
(45) Date of Patent: Sep. 16, 2003

(54) METHOD FOR THE PRODUCTION OF A CONTROLLED RHEOLOGICAL POLYPROPYLENE RESIN

(75) Inventors: Denis Bertin, Morreville (FR); Patrice Robert, Serquigny (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/959,278

(22) PCT Filed: Apr. 19, 2000

(86) PCT No.: PCT/FR00/01026

§ 371 (c)(1),
(2), (4) Date: Feb. 20, 2002

(87) PCT Pub. No.: WO00/63260

PCT Pub. Date: Oct. 26, 2000

(30) Foreign Application Priority Data

Apr. 19, 1999 (FR) .............................. 99 04888

(51) Int. Cl.⁷ .............................. C08F 8/50; C08F 10/06; C08F 255/02
(52) U.S. Cl. .................. 525/259; 525/240; 525/242
(58) Field of Search ................ 525/259, 240, 525/242

(56) References Cited

U.S. PATENT DOCUMENTS 4,672,088 A * 6/1987 Scott et al.
6,255,402 B1 * 7/2001 Boutillier et al. ........... 525/316

FOREIGN PATENT DOCUMENTS

| DE | 16 94 563 A | 11/1970 |
|---|---|---|
| EP | 0 264 156 A | 4/1988 |
| EP | 0 632 062 A | 1/1995 |
| EP | 0 837 080 A | 4/1998 |
| EP | 0 853 090 A | 7/1998 |
| FR | 2 132 780 A | 11/1972 |
| WO | WO 85 01508 A | 4/1985 |
| WO | WO 97 49737 A | 12/1997 |

* cited by examiner

Primary Examiner—James J. Seidleck
Assistant Examiner—Olga Asinovsky
(74) Attorney, Agent, or Firm—Millen, White, Zelano, Branigan, P.C.

(57) ABSTRACT

This process for the production of a controlled-rheology resin of a propylene homopolymer or copolymer or a composition that comprises a propylene homopolymer or copolymer in the absence of a functional monomer, whereby said process brings about an increase of the fluidity index of the resin by cuts of the chains, is characterized by the fact that at least one stable free radical is incorporated into said resin in the viscous state, since a solid product that has an increased fluidity index is formed. In particular, the stable free radical or radicals is or are selected from among nitroxyl radicals, comprising at least one =N—O' group.

34 Claims, No Drawings

METHOD FOR THE PRODUCTION OF A CONTROLLED RHEOLOGICAL POLYPROPYLENE RESIN

This invention relates to a process for the production of a controlled-rheology resin of a homopropylene or a propylene copolymer (block copolymer or statistical copolymer) or a polymer composition that comprises a propylene homopolymer or copolymer.

At present, this technique for controlling the rheology of these homopolymers and copolymers consists of a peroxide degradation of the latter, and it is used to develop fluid products in an efficient way without having a detrimental effect in terms of production flow rates by reducing the number of basic polymerization powders.

Thus, various products with fluidity indices that are higher than that of the base are produced from the same polymer or copolymer (generally viscous) by introducing an extrusion peroxide at the outlet of the polymerization reactor. The peroxide is broken down in the extruder to create radicals that themselves will attack the polymer chains by breaking them. In addition, the longest chains preferably will be broken, which involves a reduction of the molecular weights, whereby this reduction of molecular weights is accompanied by a reduction of the distribution of molecular weights ($\overline{M}w/\overline{M}n$).

It is also possible to melt a propylene homopolymer or copolymer powder or a polymer composition powder that comprises such a propylene homopolymer or copolymer and to incorporate in it a peroxide (repeat synthesis) for the purpose of extrusion followed by granulation.

The drawback of this process resides in the fact that these products have mechanical properties: strength and shock resistance, that are weaker than a product that is obtained directly after polymerization, extrusion and granulation or than a powder that was again subjected to extrusion and to granulation.

Documents that illustrate the prior art are: WO-A-96/12753; EP-A-570 812; U.S. Pat. No. 5,932,660; JP-A-07/138 320; U.S. Pat. No. 5,530,073; WO-A-96/06872; U.S. Pat. No. 5,705,568; U.S. Pat. No. 3,862,265; U.S. Pat. No. 5,945,492; CA-A-2 258 305; U.S. Pat. No. 4,900,781; DE-A-1 694 563; U.S. Pat. No. 4,672,088; and EP-A-0 853 090.

Seeking to solve this problem, the applicant company discovered, surprisingly enough, that by incorporating, instead of the peroxides of the prior art or in addition to the latter, stable free radicals into the resins that are to be modified, placed in a viscous state (in a molten zone of an extruder or in solvent medium), the desired resins that therefore have a higher fluidity index and better mechanical properties are obtained with the following additional advantages:

Incorporation of stable radicals that are always present after extrusion provides a better thermal stability to the products that are obtained, improves the UV resistance of the latter and reduces their tendency to depolymerize; and in the case where a peroxide is also incorporated into the resin, the latter has a more stable viscosity over time because of comprising a reservoir of heat-reacting counter-radicals. Actually, a polypropylene-type resin that is degraded by a peroxide may contain peroxide radicals. The presence of this peroxide runs the risk of modifying the viscosity of the resin when the latter is transformed (when hot), whereby during this transformation, the peroxide again plays its resin-degrading role to reduce its viscosity. Now, during storage, the peroxide has the tendency to migrate and therefore to leave the resin, and, during the storage period, the resin may therefore have a different behavior and show a viscosity that is different during or after transformation, depending on whether there is a little or a lot of peroxide. According to the process of this invention, however, the resin contains a reservoir with stable free radicals that have the tendency to neutralize the peroxide as soon as the latter is broken down, thus reducing its degradation effects, regardless of whether its concentration is high or low. The storage period thus no longer has as much effect on the viscosity of the transformed resin.

This invention relates to a process for the production of a controlled-rheology resin of a propylene homopolymer or copolymer or a composition that comprises a propylene homopolymer or copolymer, characterized by the fact that at least one stable free radical is incorporated into said resin in the viscous state in an amount that can increase the fluidity index of said resin, since a solid product that has an increased fluidity index is formed. This phrase means that the stable free radical does not prevent the fluidity index of the resin from increasing during the process of the invention, even if by itself, the stable free radical may sometimes tend to limit the extent of this increase. In any case, the process according to the invention leads to a resin with a fluidity index that is increased relative to the starting resin under the action of cuts of polymer chains, whereby said cuts take place under the action of heat and/or under the action of polymerization triggers. A polymerization trigger is defined as a free radical initiator that can bring about the cuts of polymer chains (no polymerization takes place during the process of the invention).

This invention therefore has as its object a process for the production of a controlled-rheology resin of a propylene homopolymer or copolymer or a composition that comprises a propylene homopolymer or copolymer in the absence of a functional monomer, whereby said process brings about an increase in the fluidity index of the resin by cuts of chains, characterized by the fact that at least one stable free radical is incorporated into said resin in the viscous state, since a solid product that has an increased fluidity index is formed.

The stable free radical or radicals is or are selected in particular from among the nitroxide radicals, i.e. that contain the =N—O' group, in particular from among those of formulas (Ia), (Ib) or (Ic):

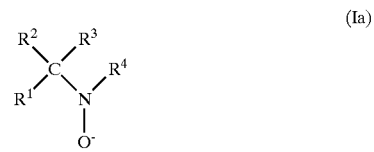

(Ia)

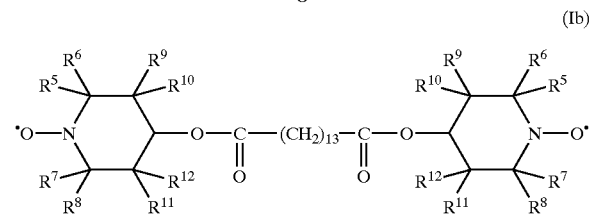

(Ib)

-continued

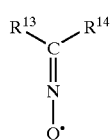
(Ic)

in which:
$R^1$ to $R^3$, $R^5$ to $R^8$, and $R^{13}$ and $R^{14}$ each represent independently:
(a) a hydrogen atom;
(b) a halogen atom, such as chlorine, bromine, or iodine;
(c) a hydrocarbon-containing, saturated or unsaturated, linear, branched or monocyclic or polycyclic group that can be substituted by at least one halogen;
(d) an ester group —COOR$^{15}$ or an alkoxyl group —OR$^{16}$, $R^{15}$ and $R^{16}$ that represent a hydrocarbon-containing group as defined in item (c) above;
(e) a group of formula

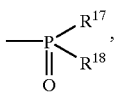

where $R^{17}$ and $R^{18}$ each independently represent a linear, branched or cyclic alkyl radical, a perfluoroalkyl radical, aryl radical, aralkyl, radical, alkaryl radical, alkoxyl radical, aryloxyl radical, aralkyloxyl radical, alkaryloxy radical, whereby these radicals can comprise 1 to 20 carbon atoms; or halogen such as chlorine, bromine, fluorine or iodine;
(f) a polymer chain that can be, for example, a poly(alkyl methacrylate) chain or a poly(alkyl acrylate) chain, such as poly(methyl methacrylate), polydiene such as polybutadiene, polyolefins such as polyethylene or polybutadiene, but that is preferably a polystyrene chain;

$R^4$ has the meanings that are defined in items (a), (b), (c), (d) and (f) above, and in the case where it is connected to the nitrogen atom by a carbon atom, the latter can carry at least one group as defined in item (e) above;

$R^9$ to $R^{12}$, identical or different, have the meanings that are defined in items (a) to (f) above and can also represent a hydroxide group or an acid group, such as —COOH, —PO(OH)$_2$ or —SO$_3$H;

$R^3$ and $R^4$ can be connected to one another—in the case where $R^4$ represents a radical —CR$^{\prime 1}$R$^{\prime 2}$R$^{\prime 3}$ (whereby $R^{\prime 1}$ to $R^{\prime 3}$ equally have the meanings of $R^1$ to $R^3$); and $R^3$ can be connected to R$^{\prime 3}$—to form a heterocycle that comprises the nitrogen atom of

whereby said
heterocycle can be saturated or unsaturated, can comprise in the cycle at least one other heteroatom and/or at least one group

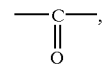

and can also comprise a cycle that is attached, saturated or unsaturated;
two from among $R^1$ to $R^3$, $R^5$ and $R^6$, $R^7$ and $R^8$, $R^9$ and $R^{10}$, $R^{11}$ and $R^{12}$, $R^6$ and $R^9$, $R^8$ and $R^{11}$, $R^{13}$ and $R^{14}$ and—in the case where $R^4$ represents a radical —CR$^{\prime 1}$R$^{\prime 2}$R$^{\prime 3}$, $R^3$ and R$^{\prime 3}$—can be connected independently to one another to form, with the carbon atom that carries them, a saturated or unsaturated cycle or heterocyle;
u is a non-zero integer, for example from 1 to 18.

As examples of hydrocarbon-containing groups as defined in item (c) above, it is possible to cite those that have 1 to 20 carbon atoms, such as the linear, branched or cyclic alkyl radicals, and the aryl radicals such as phenyl or naphthyl, and the radicals that comprise at least one aromatic cycle that can be substituted by, for example, a $C_1$–$C_4$ alkyl radical, such as the aralkyl radicals, such as benzyl.

It is possible to mention in particular the nitroxide radicals of formula (Ia) in which one among $R^2$ to $R^3$ has a molecular weight that is greater than 15, preferably greater than 30, in particular between 40 and 450.

A particular family of the nitroxide radicals that can be considered according to this invention is that of the nitroxide radicals of formula (Ia), in which $R^3$ and $R^4$ (or $R^3$ and R$^{\prime 3}$) are connected to one another and that are selected in particular from among:

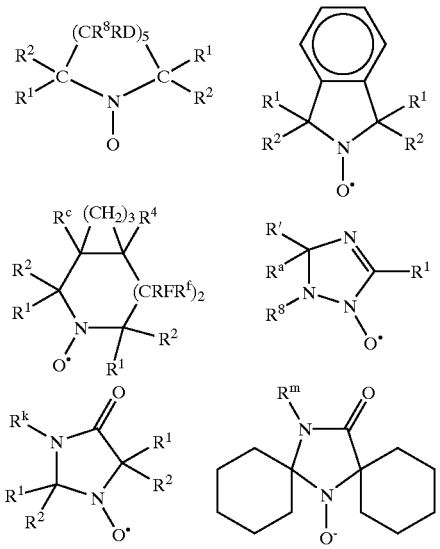

where:
$R^a$ to $R^k$ and $R^m$ independently have the meanings that are given for $R^9$ to $R^{12}$, whereby $R^a$ and $R^b$ and $R^e$ and $R^f$ can be identical or different when they are carried by different carbon atoms;
r is equal to 2 or 3 or 4;
s is a non-zero integer, in particular from 1 to 10;
t is equal to 0, 1 or 2.

Furthermore, as particular examples of nitroxide radicals, the following can be indicated:
2,2,5,5 Tetramethyl-1-pyrrolidinyloxy (generally marketing under the trademark PROXYL):

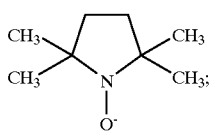

3-carboxy-2,2,5,5-tetramethyl-pyrrolidinyloxy (commonly called 3-carboxy PROXYL);

2,2,6,6-tetramethyl-1-piperidinyloxy (commonly called TEMPO):

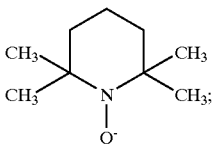

4-hydroxy-2,2,6,6-tetramethyl-1-piperidinyloxy (commonly called 4-hydroxy-TEMPO);

4-methoxy-2,2,6,6-tetramethyl-1-piperidinyloxy (commonly called 4-methoxy-TEMPO);

4-oxo-2,2,6,6-tetramethyl-1-piperidinyloxy (commonly called 4-oxo-TEMPO;

bis-(1-oxyl-2,2,6,6-tetramethylpiperidine-4-yl)sebacate, represented by the formula:

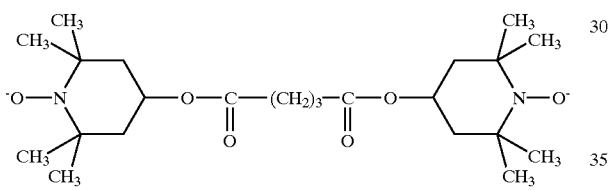

(marketed under the trademark "CXA 5415" by the "CIBA SPECIALTY CHEMICAL" Company);

2,2,6,6-tetramethyl-4-hydroxypiperidine-1-oxyl) monophosphonate:

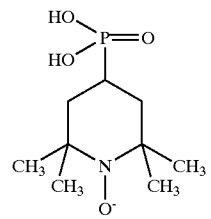

N-tert-butyl-1-diethylphosphono-2,2-dimethyl propyl nitroxide (DEPN):

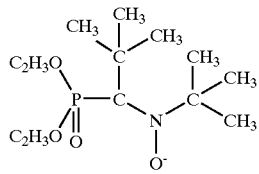

N-tert-butyl-1-dibenzylphosphono-2,2-dimethyl propyl nitroxide;

N-tert-butyl-1-di(2,2,2-trifluoroethyl)phosphono-2,2-dimethyl propyl nitroxide;

N-tert-butyl-[(1-diethylphosphono)-2-methyl-propyl] nitroxide;

N-(1-methylethyl)-1-cyclohexyl-1-(diethylphosphono) nitroxide:

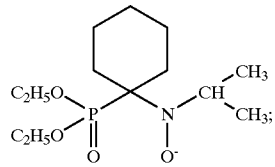

N-(1-phenylbenzyl)-[(1-diethylphosphono)-1-methyl ethyl]nitroxide:

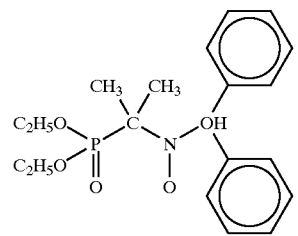

N-phenyl-1-diethylphosphono-2,2-dimethyl propyl nitroxide;

N-phenyl-1-diethylphosphono-1-methyl ethyl nitroxide;

N-(1-phenyl 2-methyl propyl)-1-diethylphosphono-1-methyl ethyl nitroxide;

N-tert-butyl-1-phenyl-2-methyl propyl nitroxide:

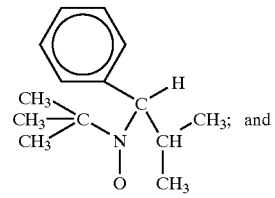

N-tert-butyl-1-(2-naphthyl)-2-methyl propyl nitroxide.

It is also possible to cite 2,4,6-tri-tert-butyl phenoxy as a non-nitroxide stable radical.

It is possible to incorporate into the resin in the viscous state from 1 ppm to 5% by weight, in particular 10 ppm to 5% by weight, of at least one stable free radical relative to said resin.

Furthermore, according to a particular characteristic of this invention, at least one radical-type polymerization trigger is incorporated into the resin in the viscous state in an amount that is adequate to obtain, after reaction, the resin with the desired viscosity. The value of this viscosity is expressed by MFI, in g/10 minutes.

The radical-type polymerization triggers that can be used are all those that are known to one skilled in the art. It is possible to cite diacyl peroxides, peroxyesters, peroxyketals, dialkyl peroxides, hydroperoxides, peroxydicarbonates, azo compounds and peroxyphthalides.

In particular, it is possible to cite, by way of examples, the radical-type polymerization triggers, from among:

Benzoyl peroxide;

lauroyl peroxide;

decanoyl peroxide;

3,5,5-trimethylhexanoyl peroxide;

acetyl peroxide and sulfonyl cyclohexyl;
tert-butyl peroxybenzoate;
tert-butyl peroxyacetate;
tert-butyl peroxy-3,5,5-trimethylhexanoate;
tert-amyl peroxy-3,5,5-trimethylhexanoate;
2,5-dimethyl-2,5-di(benzoylperoxy)hexane;
OO-tert-butyl-O-isopropyl-monoperoxy carbonate;
OO-tert-butyl-O-(2-ethylhexyl)monoperoxy carbonate;
OO-tert-amyl-O-(2-ethylhexyl)monoperoxy carbonate;
tert-butyl peroxyisobutyrate;
tert-butyl peroxy-2-ethylhexanoate;
tert-amyl peroxy-2-ethylhexanoate;
2,5-dimethyl-2,5-di(2-ethylhexanoyl peroxy)hexane;
tert-butyl peroxypivalate;
tert-amyl peroxypivalate;
tert-butyl peroxyneodecanoate;
tert-butyl peroxyisononanoate;
tert-amyl peroxyneodecanoate;
α-cumyl peroxyneodecanoate;
3-hydroxy-1,1-dimethylbutyl-peroxyneodecanoate;
tert-butyl peroxymaleate;
ethyl 3,3-di(tert-butylperoxy)butyrate;
ethyl 3,3-di(tert-amylperoxy)butyrate;
n-butyl 4,4-di(tert-butylperoxy)valerate;
2,2-di(tert-butylperoxy)butane;
1,1-di(tert-butylperoxy)cyclohexane;
1,1-di(tert-butylperoxy)cyclohexane;
1,1-di(tert-butylperoxy)3,3,5-trimethylcyclohexane;
1,1-di(tert-amylperoxy)cyclohexane;
2,2-bis-(4,4-ditert-butyl peroxy cyclohexyl)propane);
2,5-dimethyl-2,5-di(tert-butylperoxy)hexyne-(3);
di-tert-butyl peroxide;
di-tert-amyl peroxide;
tert-butyl peroxide and cumyl peroxide;
1,3-di(tert-butylperoxy-isopropyl)-benzene;
2,5-dimethyl-2,5-di(tert-butylperoxy)hexane;
1,1,4,4,7,7-hexamethylcyclo-4,7-diperoxynonane;
3,3,6,6,9,9-hexamethylcyclo-1,2,4,5-tetraoxa-nonane;
tert-butyl hydroperoxide;
tert-amyl hydroperoxide;
cumyl hydroperoxide;
2,5 dimethyl-2,5-di(hydroperoxy)hexane;
diisopropylbenzene mono hydroperoxide;
paramethane hydroperoxide;
di-(2-ethylhexyl)peroxydicarbonate;
dicyclohexyl peroxydicarbonate;
2,2'-azo-di(2-acetoxypropane);
2,2'-azobis(isobutyronitrile);
2,2'-azobis(2,4-dimethylvaleronitrile);
2,2'-azobis(cyclohexanenitrile);
2,2'-azobis-(2-methylbutyronitrile) and
2,2'-azobis(2,4-dimethyl-4-methoxyvaleronitrile); and
3-phenyl-3-tert-butyl-peroxyphthalide.

It is possible to incorporate the radical-type polymerization triggers in an amount that ranges up to 5% by weight, in particular at a rate of 50 ppm to 0.5% by weight, relative to the weight of the resin.

Furthermore, it is possible to use an SFR·$F_{SFR}$/AMO·$F_{AMO}$ ratio of 0.0001 to 2.5, in particular 0.005 to 2.5, with:

SFR representing the stable free radical mole number in the medium;

$F_{SFR}$ representing the functionality of the stable free radical, i.e., the number of sites on the same stable free radical molecule that exhibits the stable free radical state;

AMO representing the trigger mole number in the medium;

$F_{AMO}$ representing the functionality of the trigger, i.e., the number of sites that exhibit the free radical state that each trigger molecule is capable of generating. The starting resin is in particular a propylene homopolymer. It is possible to mention all of the possible propylene homopolymers: isotactic polypropylene, atactic polypropylene, syndiotactic polypropylene.

The starting resin can also be a copolymer of the statistical or block propylene, whereby the comonomer or comonomers represent(s) up to 10% by weight of said copolymer. The comonomer or comonomers are selected in particular from among alkylenes, such as ethylene and butylene, dienes, and vinylaromatic monomers, such as styrene. It is possible to cite, by way of examples, the alkylene/propylene copolymers, such as ethylene-propylene block and statistical copolymers, and terpolymers such as alkylene/propylene/butylene, like the ethylene/propylene/butylene terpolymers; monomer propylene/diene copolymers; and styrene-propylene copolymers.

It is also possible to cite, as a starting resin, a propylene homopolymer or a propylene copolymer as defined above mixed with at least one other polymer that is selected in particular from among polyethylene, polystyrene, poly(methyl methacrylate), polybutadiene, an EPDM (monomer ethylene-propylene-diene copolymer), an ethylene-acrylate copolymer, an ethylene-acrylic acid copolymer, an ethylene-acrylate-maleic anhydride terpolymer.

In such a mixture, the other polymer or polymers generally represent at most 50% by weight of the mixture.

It is further specified that the basic resin contains little (less than 200 ppm) or no functional monomer such as maleic anhydride and other functional monomers that comprise the carboxylic acid groups and their derivatives, acid chlorides, isocyanates, oxazolines, epoxides, amines or hydroxides, of which examples are given in U.S. Pat. No. 5,705,563.

According to a first embodiment of the process according to the invention, the stable free radical or radicals, and, if necessary, the trigger or triggers, are introduced into at least one molten zone of the extruder located at the outlet of the reactor for synthesis of the propylene homopolymer or copolymer, or into at least one molten zone of the extruder that is used for repeat synthesis of the propylene homopolymer or copolymer, or else into another extruder that is not necessarily found at the outlet of the polymerization reactor, in which case all of the products that are to be incorporated into the formulation are fed into the extruder.

The resin in the viscous state and the stable radical or stable radicals, and, if necessary, the radical-type polymerization trigger or triggers, and, if necessary, one other polymer or polymers are then brought into contact generally at a temperature of 100° C. to 350° C., in particular at a temperature of 160° C. to 250° C., and generally for a period of 10 seconds to 5 hours, preferably for a period of 10 seconds to 1 hour, and, in particular, 15 seconds to 1 minute.

Advantageously, it is possible to introduce the stable free radical or radicals and, if necessary, the trigger or triggers, in solution in a solvent, such as trichlorobenzene, whereby the concentration of the stable free radical or radicals is 1 to 100% by weight (100% corresponding to the absence of solvent). For example, this solution of the stable radical or radicals, and, if necessary, the trigger or triggers, is introduced at an injection flow rate of 0.01–5% by weight of the total flow rate. This solvent, which makes the flow rate exact, is eliminated during the extrusion into degassing wells.

It is also possible to incorporate the stable free radical or radicals, and, if necessary, the trigger or triggers, via a master-batch, such as a mixture of polypropylene or polyethylene powder.

The modified resin according to the process of this invention leaves the extruder in the form of a rod, which is then directed in a known way to a granulation device.

According to a second embodiment of the process according to the invention, the stable radical or radicals, and, if necessary, the polymerization trigger or triggers, are introduced into the starting resin that is placed in the solvent medium at a temperature of 80° C. to 350° C. The solvent is selected in particular from among the aliphatic, cycloaliphatic and aromatic hydrocarbons, and, if necessary, halogenated (chlorinated) hydrocarbons.

The resin, the stable free radical or radicals, and, if necessary, the trigger or triggers in the presence of solvent are introduced into a reactor, such as a polymerization reactor, and the unit is brought to the desired temperature. This temperature is selected based on the components that are introduced (stable free radicals and triggers). The reaction time is also determined based on the trigger: this reaction time is selected between 3 and 10 half-lives of the trigger at the reaction temperature. After the reaction, the reaction mixture is purified, for example by introduction of the latter via a gear pump into a devolatizer to eliminate the solvent. The molten polymer is then also introduced via a gear pump into a die, followed by a granulator, to obtain granules of the final resin.

With regard to the solvents, it is possible to use all of the solvents of the polyolefins.

Furthermore, in a general manner, a trigger is preferably present for a temperature that is lower than 200° C. It is not possible to have a trigger above 200° C. there.

In the absence of a trigger, the degradation takes place by cuts of the chain by a radical-type mechanism under the action of heat alone (so-called "beta-scission" mechanism).

The following examples illustrate this invention without, however, limiting its scope. In these examples:

The percentages are by weight unless otherwise indicated;
the values of fluidity indices IF (Melt Index) have been measured at 230° C., below 2.16 kg, according to ISO Standard 1133:91;
the values of the mean molecular weights by number ($\overline{Mn}$) and mean molecular weights by weight ($\overline{M}$) have been measured by GPC;
the values of the modulus were measured on 80×10×4 specimens, according to ISO Standard 178:93;
the notched Charpy impact tests were carried out at 23° C. on 80×10×4 specimens, according to ISO Standard 179-1eA;
the high-speed impact tests or "FWI" were carried out on a 100×100×2 plate with a speed of the impact separator of 4.3 m/second.

Furthermore, the following abbreviations were used:

I—Propylene Polymer

HomoPP: Propylene homopolymer that exhibits the following characteristics:
Fluidity index (2.16 kg, 230° C.): 3 g/10 minutes
Density: 0.905 g/cm$^3$
Melting point: 163° C.
$\overline{Mn}$=52 200
$\overline{Mw}$=296 200
Ip (polymolecularity index $\overline{Mw}/\overline{Mn}$)=5.7
Modulus: 1256 MPa
Notched Charpy impact: 3.1 kJ/m$^2$.

PPcopo: copolymer with propylene/ethylene blocks that exhibit the following characteristics:
Fluidity index (2.16 kg, 230° C.): 1 g/10 minutes
Density: 0.902 g/cm$^3$
Melting point: 163° C.
Flexural modulus: 1200 MPa
High-speed impact: 80 kJ/m$^2$.

II—Free Radical

TEMPO: 2,2,6,6-Tetramethyl-1 piperidinyloxy ($C_9H_{18}NO$), with molecular weight 156.25 and melting point 38° C.

TEMPOL: (4-Hydroxy-TEMPO)=4-hydroxy-2,2,6,6-tetramethyl-1-piperidinyloxy

III—Trigger

DHBP: 2,5-Bis-(tert-butylperoxy)-2,5-dimethyl-hexane, of a developed formula:

$$(CH_3-\underset{\underset{CH_3}{|}}{\overset{\overset{CH_3}{|}}{C}}-O-O-\underset{\underset{CH_3}{|}}{\overset{\overset{CH_3}{|}}{C}}-CH_2)_{\overline{2}}$$

with molecular weight 290.4, in liquid form, with a purity that is equal to 92%.

EXAMPLE 1 (REFERENCE)

Running HomoPP Only Through an Extruder

A LEISTRITZ extruder No. 30-34 with two co-rotating screws is used that is made to operate under the following conditions:
Total flow rate: 12 kg/h;
Screw speed: 75 rpm;
Temperature profile:

| Zone 1 | Zone 2 | Zone 3 | Zone 4 | Zone 5 | Zone 6 | Zone 7 | Zone 8 | Zone 9 |
| --- | --- | --- | --- | --- | --- | --- | --- | --- |
| 200° C. | 180° C. | 200° C. | 210° C. | 220° C. | 220° C. | 210° C. | 200° C. | 180° C. |

The degassing is carried out in zone 7.

The homoPP granules are introduced via an apparatus that meters by weight, K-TRON T20, into the extruder. The machine is run for 20 minutes without incident at a total flow rate of 12 kg/h, and then the sample of about 10 kg is collected and conditioned in a sealed bag.

The characteristics and the mechanical properties of the homoPP that has run through the extruder are indicated in Table 1 below.

EXAMPLE 2 (FOR COMPARISON)

Obtaining a Degraded HomoPP by Running Basic HomoPP Through an Extruder with Incorporation of DHBP The procedure is performed as in Example 1 except that a DHBP solution in trichlorobenzene is injected into zone 2 of the extruder by a double-body DOSAPRO pump, whereby the DHBP content is adjusted to have an injection flow rate of the solution of 1% of the total flow rate. The amount of DHBP relative to basic homoPP is indicated in Table 1.

The characteristics and the mechanical properties of homoPP that is thus degraded are also indicated in Table 1 below.

[Key to Table 1:]
Exemple=Example
DHBP réel (ppm)=Actual DHBP (ppm)
TEMPO réel (ppm)=Actual TEMPO (ppm)
Rapport molaire TEMPO/DHBP=TEMPO/DHBP molar ratio
Module=Modulus
Choc Charpy entaillé Energie à 23° C.=Notched Charpy impact, Energy at 23° C.
HomoPP de base=Basic homoPP
Comparatif=For comparison It is noted that the incorporation of the stable free radical made it possible to obtain a homoPP that has a fluidity index in the desired range, with a better shock resistance property while preserving the same strength.

EXAMPLE 5 (REFERENCE)

Running HomoPP Only Through an Extruder

The procedure is performed as in Example 1, except that the temperature profile of the extruder is modified as follows.

| Zone 1 | Zone 2 | Zone 3 | Zone 4 | Zone 5 | Zone 6 | Zone 7 | Zone 8 | Zone 9 |
|---|---|---|---|---|---|---|---|---|
| 200° C. | 180° C. | 200° C. | 230° C. | 250° C. | 250° C. | 240° C. | 200° C. | 180° C. |

EXAMPLES 3 AND 4 (INVENTION)

Obtaining a Degraded HomoPP of Improved Quality by Running Basic HomoPP Through an Extruder with Incorporation of DHBP+TEMPO The procedure is performed as in Example 2, except that a solution is injected at the indicated flow rate into DHBP+TEMPO trichlorobenzene, whereby the amounts of DHBP and TEMPO relative to homoPP are also indicated in Table 1.

EXAMPLE 6 (FOR COMPARISON)

Obtaining a Degraded HomoPP by Running Basic HomoPP Through an Extruder with Incorporation of DHBP The procedure is performed as in Example 5, except that a DHBP solution in trichlorobenzene is injected into zone 2 of the extruder by a double-body DOSAPRO pump, whereby the DHBP content is adjusted to have an injection flow rate of the solution of 1% of the total flow rate. The DHBP quality relative to the basic homoPP is indicated in Table 2.

The characteristics and the mechanical properties of the homoPP that is thus degraded are also indicated in Table 2 below.

The results also appear in Table 1.

| Exemple | DHBP réel (ppm)* | TEMPO réel (ppm) | Rapport molaire TEMPO/DHBP | Trichlorobenzène (%) | IF (g/10 min.) | $\overline{Mn}$ | $\overline{Mw}$ | Ip | Module (MPa) | Choc Charpy entaillé Energie à 23° C. (kJ/m$^2$) |
|---|---|---|---|---|---|---|---|---|---|---|
| HomoPP de base | | | | | 3.6 | 52 200 | 296 200 | 5.7 | 1256 | 3.1 |
| 1 (Référence) | 0 | 0 | 0 | | 3.9 | 60 890 | 313 000 | 5.1 | 1253 | 3.1 |
| 2 (Comparatif) | 512 | 0 | 0 | 0.95 | 34.2 | 44 540 | 174 100 | 3.9 | 1166 | 2.2 |
| 3 (Invention) | 513 | 26 | 0.1 | 0.5 | 26.4 | 39 710 | 150 600 | 3.8 | 1165 | 2.7 |
| 4 (Invention) | 2050 | 1013 | 1 | 0.78 | 24.5 | 40 900 | 156 200 | 3.8 | 1166 | 2.8 |

*The fact that the DHBP is 92% pure is taken into consideration.

EXAMPLES 7 TO 9 (INVENTION)

Obtaining a Degraded HomoPP of Improved Quality by Running Basic HomoPP Through an Extruder with Incorporation of DHBP+TEMPO The procedure is performed as in Example 6, except that a solution is injected at the indicated flow rate into trichlorobenzene, DHBP+TEMPO, whereby the amounts of DHBP+TEMPO relative to the basic homoPP are also indicated in Table 2.

EXAMPLE 10 (REFERENCE)

Running PPCoPo Only Through an Extruder

The procedure is performed as in Example 1 by replacing homoPP by PPCopo.

The characteristics and the mechanical properties of the PPCopo that is run through an extruder are indicated in Table 3 below.

The results also appear in Table 2.

| Exemple | DHBP réel (ppm)* | TEMPO réel (ppm) | Rapport molaire TEMPO/DHBP | Trichloro-benzène (%) | IF (g/10 min.) | $\overline{Mn}$ | $\overline{Mw}$ | Ip | Module (MPa) | Choc Charpy entaillé Energie à 23° C. (kJ/m$^2$) |
|---|---|---|---|---|---|---|---|---|---|---|
| HomoPP de base |  |  |  |  | 3.6 | 52 200 | 296 200 | 5.7 | 1256 | 3.1 |
| 5 | 0 | 0 | 0 |  | 4.3 | 52 590 | 274 400 | 5.2 | 1235 | 3.2 |
| 6 | 513 | 0 | 0 | 0.95 | 38.9 | 41 430 | 144 500 | 3.5 | 1146 | 2.4 |
| 7 | 500 | 27 | 0.1 | 0.95 | 41.1 | 46 180 | 165 900 | 3.6 | 1183 | 2.3 |
| 8 | 500 | 135 | 0.5 | 0.94 | 35.4 | 44 920 | 174 100 | 3.9 | 1211 | 2.2 |
| 9 | 2050 | 1103 | 1 | 0.95 | 46.1 | 41 880 | 139 500 | 3.3 | 1202 | 2.2 |

*The fact that the DHBP is 92% pure is taken into consideration.

[Key to Table 2:]

Exemple=Example
DHBP réel (ppm)=Actual DHBP (ppm)
TEMPO réel (ppm)=Actual TEMPO (ppm)
Rapport molaire TEMPO/DHBP=TEMPO/DHBP molar ratio
Module=Modulus
Choc Charpy entaillé Energie à 23° C.=Notched Charpy impact, Energy at 23° C.
HomoPP de base=Basic homoPP It is noted that the incorporation of the stable free radical made it possible to obtain a homoPP that has a fluidity index in the desired range with a better strength while preserving the same shock resistance property.

EXAMPLES 11 TO 13 (FOR COMPARISON)

Obtaining a Degraded PPCbpo by Running Basic PPCopo Through an Extruder with Incorporation of DHBP The procedure is as in Example 2, except that the DHBP is fed by master-batch to powder PE.

The characteristics and the mechanical properties of the thus degraded PPCopo are also indicated in Table 3.

EXAMPLES 14 TO 19

Obtaining a Degraded PPCopo of ImProved Quality by Running Basic PPCopo Through an Extruder with Incorporation of DHBP+TEMPOL The procedure is performed as for Examples 11 to 13, except that both DHBP and TEMPOL are injected.

The results appear in Table 3.

TABLE 3

| Exemple | DHBP (ppm) | TEMPO (ppm) | Poudre PE (%)* | Rapport molaire Tempo/DHBP | IF (g/10 min) | Module (MPa) | Choc à grande vitesse à 23° C. | Choc à grande vitesse à −20° C. |
|---|---|---|---|---|---|---|---|---|
| 10 (référence) | 0 | 0 | 0 |  | 1 | 1200 | 80 | 70 |
| 11 (comparatif) | 950 | 0 | 4 | 0 | 23 | 925 | 39 | 22 |
| 12 (comparatif) | 1250 | 0 | 4 | 0 | 36 | 900 | 38 | 22 |
| 13 (comparatif) | 1600 | 0 | 4 | 0 | 57 | 870 | 37 | 22 |
| 14 | 1500 | 445 | 4 | 0.5 | 27 | 860 | 42 | 29 |
| 15 | 1950 | 578 | 4 | 0.5 | 43 | 875 | 41.5 | 26.5 |
| 16 | 2250 | 667 | 4 | 0.5 | 62 | 875 | 38 | 26 |
| 17 | 2000 | 1186 | 4 | 1 | 25 | 890 | 40 | 25 |
| 18 | 3000 | 1780 | 4 | 1 | 36 | 900 | 39 | 26.5 |
| 19 | 4600 | 2730 | 4 | 1 | 65 | 885 | 39 | 24 |

*pourcentage indiqué par rapport à la base de PP
*Percentage indicated relative to the PP base

[Key to Table 3:]

Exemple=Example

Poudre PE=Powder PE

Rapport molaire Tempo/DHBP=Tempo/DHBP molar ratio

Module=Modulus

Choc à grande vitesse à 23° C.=High-speed impact at 23° C.

Choc à grande vitesse à −20° C.=High-speed impact at −20° C.

référence=Reference comparatif=For comparison

It is noted that the incorporation of the stable free radical made it possible to obtain a PPCopo with superior shock resistance results.

TEST EXAMPLE 20

UV Behavior of HomoPP Degraded by Peroxide in an Extruder in the Presence of TEMPO The irradiations were carried out on films produced in the heating press. The UV ageing tests were conducted by exposure in a SEPAP 12-24 chamber according to the conditions described in NF T 54-190:

Medium-pressure mercury lamps with a unit power of 400 W, whose jackets filter UV below 290 nm:

continuous exposure:

no spraying of the samples;

uncontrolled relative humidity;

temperature measured and regulated on film by a contact probe: 60° C.±2° C.;

calibration of the chamber by a weakly stabilized PEBD film for which the oxidation state measured at 1715 cm$^{-1}$ is equal to 0.12±0.02 after 100 hours of irradiation.

The oxidation state of the various samples is followed by IRTF by transmission into the carbonyl zone. Based on these spectra, it is therefore possible to meter the carbonyl rates that are equivalent to the photooxidation products. It makes it possible to establish the photooxidation kinetics of various products. The measurement is carried out at 1713 cm$^{-1}$ (carbonyl-induced absorbance of acid groups that are equivalent to a cut of a chain). The frequency of measurements is based on the state of oxidation of the preceding control.

Table 4 below illustrates the results that are obtained.

TABLE 4

| HomoPP de R Ex. | DHBP réel (ppm) | TEMPO réel (ppm) | Rapport Molaire TEMPO/ OHBP | Pro[i] de température: Cf. Ex. | VARIATION DE LA DENSITÉ OPTIQUE À 1713 CM$^{-1}$ EN FONCTION DO TEMPS D'IRRADIATION TEMPS (HEURES) | | | | |
|---|---|---|---|---|---|---|---|---|---|
| | | | | | 17 | 34 | 50 | 66 | 70 |
| | | | | | 0 | 0.1492 | 0.3316 | 0.4685 | 0.6622 |
| 2 | 512 | 0 | 0 | 1 | 0 | 0.0866 | 0.245 | 0.4285 | 0.7004 |
| 7 | 500 | 27 | 0.1 | 5 | 0 | 0.1026 | 0.2741 | 0.4418 | 0.6216 |
| 8 | 500 | 135 | 0.5 | 5 | 0 | | | | 0.1743 |
| 4 | 2050 | 1013 | 1 | 1 | 0 | | | | 0.0457 |

| HomoPP de R Ex. | VARIATION DE LA DENSITÉ OPTIQUE À 1713 CM$^{-1}$ EN FONCTION DO TEMPS D'IRRADIATION TEMPS (HEURES) | | | | | | | |
|---|---|---|---|---|---|---|---|---|
| | 74 | 78 | 95 | 111 | 127 | 135 | 159 | 183 |
| 2 | 0.4508 arrêt | arrêt — | | | | | | |
| 7 | 0.5417 | arrêt | | | | | | |
| 8 | | 0.2475 | 0.4326 | arrêt | | | | |
| 4 | | 0.0493 | 0.0653 | 0.107 | 0.155 | 0.1845 | 0.2543 | 0.4056 |

[Key to table 4:]

homoPP de l'Ex.=homoPP of the example

DHBP réel (ppm)=Actual DHBP (ppm)

TEMPO réel (ppm)=Actual TEMPO (ppm)

Rapport molaire TEMPO/DHBP=TEMPO/DHBP molar ratio

Profil de température=Temperature profile

VARIATION DE LA DENSITÉ OPTIQUE À 1713 CM$^{-1}$ EN FONCTION DU TEMPS D'IRRADIATION= VARIATION OF THE OPTICAL DENSITY AT 1713 CM$^{-1}$ BASED ON IRRADIATION TIME

TEMPS (HUERES)=TIME (HOURS)

arrêt=shutdown

What is claimed is:

1. A process for production of a controlled-rheology resin, said process comprising adding at least one stable free radical to a resin containing of a propylene homopolymer or copolymer wherein said resin contains less than 200 ppm of a functional monomer, whereby said process increase the fluidity index of the resin by cuts of the chains, and a solid product that has an increased fluidity index is formed.

2. A process according to claim 1, wherein the stable free radical or radicals is or are selected from among the nitroxyl radicals that comprise at least one =N—O' group.

3. A process according to claim 2, wherein the nitroxyl radicals are selected from formulas (Ia), (Ib) or (Ic):

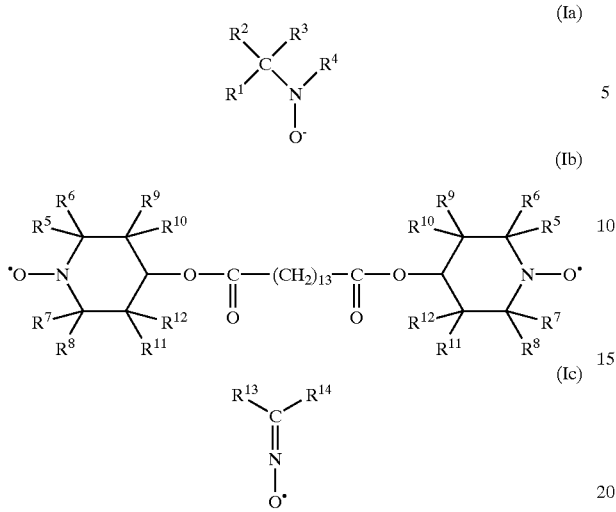

in which

R¹ to R³, R⁵ to R⁸, and R¹³ and R¹⁴ each represent independently:
(a) a hydrogen atom;
(b) s halogen atom;
(c) a hydrocarbon-containing, saturated or unsaturated, linear, branched or monocyclic or polycyclic group which is unsubstituted or substituted by at least one halogen;
(d) an ester group —COOR¹⁵ or an alkoxyl group —OR , wherein R¹⁵ and R¹⁶ each represent a hydrocarbon-containing group as defined in item (c) above;
(e) a group of formula

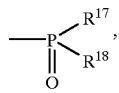

where $R^{17}$ and $R^{18}$ each independently represent a linear, branched or cyclic alkyl radical, a perfluoroalkyl radical, aryl radical, aralkyl, radical, alkaryl radical, alkoxyl radical, aryloxyl radical, aralkyloxyl radical, or alkaryloxy radical, in each case having 1 to 20 carbon atoms; or halogen;
(f) a polymer chain;

$R^4$ has the meanings defined in items (a), (b), (c), (d) and (f) above, and in the case where it is connected to the nitrogen atom by a carbon atom, the latter can carry at least one group as defined in item (e) above;

$R^9$ to $R^{12}$, identical or different, have the meanings defined in items (a) to (f) above and can also represent a hydroxide group or an acid group;

$R^3$ and $R^4$ can also be connected to one another wherein $R^4$ represents a radical-$CR'^1R'^2R'^3$, in which $R'^1$ to $R'^3$ each have a meaning in accordance with $R^1$ to $R^3$, and $R^3$ is connected to $R'^3$—to form a heterocycle that comprises the nitrogen atom of N—O', whereby said heterocycle is saturated or unsaturated, may contain in the cycle at least one other heteroatom and/or at least one group $$-\overset{\phantom{x}}{\underset{O}{\overset{\phantom{x}}{C}}}-,$$

and can also
comprise a cycle that is attached, saturated or unsaturated;
two from among $R^1$ to $R^3$, $R^5$ and $R^6$, $R^7$ and $R^8$, $R^9$ and $R^{10}$, $R^{11}$ and $R^{12}$, $R^6$ and $R^9$, $R^8$ and $R^{11}$, $R^{13}$ and $R^{14}$ and—in the case where $R^4$ represents a radical —$CR'^1R'^2R'^3$, $R^3$ and $R'^3$—can be connected independently to one another to form, with the carbon atom that carries them, a saturated or unsaturated cycle or heterocyle;
u is a non-zero integer.

4. A process according to claim 3, wherein the nitroxyl radicals of formula (Ia), in which $R^3$ and $R^4$ or $R^3$ and $R'^3$ are connected to one another, are selected from among:

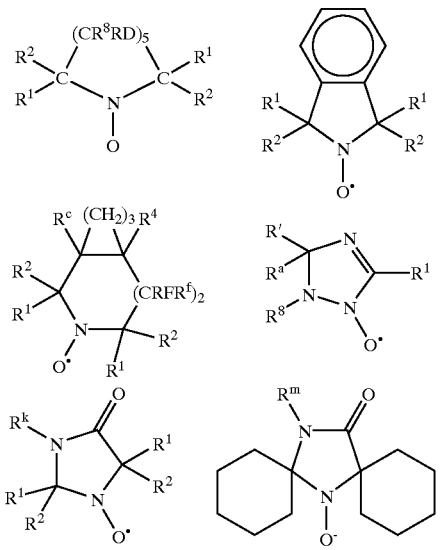

where:
$R^a$ to $R^k$ and $R^m$ independently are selected from the meanings given for $R^9$ to $R^{12}$, whereby $R^a$ and $R^b$ and $R^e$ and $R^f$ can be identical or different when they are carried by different carbon atoms;
r is equal to 2 or 3 or 4;
s is a non-zero integer, and
t is equal to 0, 1 or 2.

5. A process according to claim 3, wherein said at least one stable nitroxide radical is selected from among:
2,2,5,5 Tetramethyl-1-pyrrolidinyloxy;
3-carboxy-2,2,5,5-tetramethyl-pyrrolidinyloxy;
2,2,6,6-tetramethyl-1-piperidinyloxy;
4-hydroxy-2,2,6,6-tetramethyl-1-piperidinyloxy;
4-methoxy-2,2,6,6-tetramethyl-1-piperidinyloxy;
4-oxo-2,2,6,6-tetramethyl-1-piperidinyloxy;
bis-(1-oxyl-2,2,6,6-tetramethylpiperidine4-yl)sebacate;
2,2,6,6-tetramethyl-4-hydroxypiperidine-1-oxyl) monophosphonate;
N-tert-butyl-1-diethylphosphono-2,2-dimethyl propyl nitroxide;
N-tert-butyl-1-dibenzylphosphono-2,2-dimethyl propyl nitroxide;

N-tert-butyl-1-di(2,2,2-trifluoroethyl)phosphono-2,2-dimethyl propyl nitroxide;

N-tert-butyl-[(1-diethylphosphono)-2-methyl-propyl] nitroxide.

N-(1-methylethyl)-1-cyclohexyl-1-(diethylphosphono) nitroxide;

N-(1-phenylbenzyl)-[(1-diethylphosphono)-1-methyl ethyl]nitroxide;

N-phenyl-1-diethylphosphono-2,2-dimethyl propyl nitroxide;

N-phenyl-1-diethylphosphono-1-methyl ethyl nitroxide;

N-(1-phenyl 2-methyl propyl)-1-diethylphosphono-1-methyl ethyl nitroxide;

N-tert-butyl-1-phenyl-2-methyl propyl nitroxide; and

N-tert-butyl-1-(2-naphthyl)-2-methyl propyl nitroxide.

6. A process according to claim 1, wherein 2,4,6-tri-tert-butylphenoxy is used as a stable free radical.

7. A process according to claim 1, wherein 1 ppm to 5% by weight of at least one stable free radical relative to the resin is incorporated into said resin in the viscous state.

8. A process according to claim 7, wherein 10 ppm to 5% by weight of at least one stable free radical relative to the resin is incorporated into said resin in the viscous state.

9. A process according to claim 1, wherein at least one radical-type polymerization trigger is incorporated into the resin in the viscous state.

10. A process according to claim 9, wherein the radical-type polymerization trigger or triggers is or are selected from among the diacyl peroxides, peroxyesters, peroxyketals, dialkyl peroxides, hydroperoxides, peroxydicarbonates, azo esters and peroxyphthalides.

11. A process according to claim 10, wherein the radical-type polymerization trigger or triggers is or are selected from among:

benzoyl peroxide;
lauroyl peroxide;
decanoyl peroxide;
3,5,5-trimethylhexanoyl peroxide;
acetyl peroxide and sulfonyl cyclohexyl;
tert-butyl peroxybenzoate;
tert-butyl peroxyacetate;
tert-butyl peroxy-3,5,5-trimethylhexanoate;
tert-amyl peroxy-3,5,5-trimethylhexarnoate;
2,5-dimethyl-2,5-di(benzoylperoxy)hexane;
OO-tert-butyl-O-isopropyl-monoperoxy carbonate;
OO-tert-butyl-O-(2-ethylhexyl)monoperoxy carbonate;
OO-tert-amyl-O-(2-ethylhexyl)monoperoxy carbonate;
tert-butyl peroxyisobutyrate;
tert-butyl peroxy-2-ethylhexanoate;
tert-amyl peroxy-2-ethylhexanoate;
2,5-dimethyl-2,5-di(2-ethylhexanoyl peroxy)hexane;
tert-butyl peroxypivalate;
tert-amyl peroxypivalate;
tert-butyl peroxyneodecanoate;
tert-butyl peroxyisononanoate;
tert-amyl peroxyneodecanoate;
α-cumyl peroxyneodecanoate;
3-hydroxy-1,1-dimethylbutyl-peroxyneodecanoate;
tert-butyl peroxymaleate;
ethyl 3,3-di(tert-butylperoxy)butyrate;
ethyl 3,3-di(tert-amylperoxy)butyrate;
n-butyl 4,4-di(tert-butylperoxy)valerate;
2,2-di(tert-butylperoxy)butane;
1,1-di(tert-butylperoxy)cyclohexane;
1,1-di(tert-butylperoxy)cyclohexane;
1,1-di(tert-butylperoxy)3,3,5-trimethylcyclohexane;
1,1-di(tert-amylperoxy)cyclohexane;
2,2-bis-(4,4-ditert-butyl peroxy cyclohexyl)propane;
2,5-dimethyl-2,5-di(tert-butylperoxy)hexyne-(3);
di-tert-butyl peroxide;
di-tert-amyl peroxide;
tert-butyl peroxide and cumyl peroxide;
1,3-di(tert-butylperoxy-isopropyl)-benzene;
2,5-dimethyl-2,5-di(tert-butylperoxy)hexane;
1,1,4,4,7,7-hexamethylcyclo-4,7-diperoxynonane;
3,3,6,6,9,9-hexamethylcyclo-1,2,4,5-tetraoxa-nonane;
tert-butyl hydroperoxide;
tert-amyl hydroperoxide;
cumyl hydroperoxide;
2,5 dimethyl-2,5-di(hydroperoxy)hexane;
diisopropylbenzene mono hydroperoxide;
paramethane hydroperoxide;
di-(2-ethylhexyl) peroxydicarbonate;
dicyclohexyl peroxydicarbonate;
2,2'-azo-di(2-acetox),propane);
2,2'-azobis(isobutyronitrile);
2,2'-azobis(2,4-dimethylvaleronitrile);
2,2'-azobis(cyclohexanenitrile);
2,2'-azobis-(2-methylbutyronitrile);
2,2'-azobis(2,4-dimethyl-4-methoxyvaleronitrile); and
3-phenyl-3-tert-butyl-peroxyphthalide.

12. A process according to claim 9, wherein the radical-type polymerization trigger or triggers is or are incorporated in an amount that ranges up to 5% by weight relative to the weight of the resin.

13. A process according to claim 12, wherein the radical-type polymerization trigger or triggers is or are incorporated in an amount of 50 ppm at 0.5% by weight relative to the weight of the resin.

14. A process according to claim 9, wherein the SFR·$F_{SFR}$/AMO-$F_{AMO}$ ratio is 0.0001 to 2.5 wherein:

SFR represent the stable free radical mole number in the medium;

$F_{SFR}$ represent the functionality of the stable free radical;

AMO represent the trigger mole number in the medium; and $F_{AMO}$ represent the functionality of the trigger.

15. A process according to claim 14, wherein the SFR $F_{SFR}$/AMO-$F_{AMO}$ ratio is 0.005 to 2.5.

16. A process according to claim 1, wherein a propylene homopolymer is used as the starting resin.

17. A process according to claim 1, wherein a copolymer of the statistical or block propylene is used as the a starting resin, wherein the comonomer or comonomers represent up to 10% by weight of said copolymer.

18. A process according to claim 17, wherein the comonomer or conomoners is or are selected from among alkylenes, dienes and vinylaromatic monomers.

19. A process according to claim 17, wherein the starting resinis used in a mixture with at least one other polymer selected from among polyethylene, polystyrene, poly (methyl methacrylate), polybutadiene, an EPDM (monomer ethylene-propylene-diene copolymer), an ethylene-acrylate copolymer, an ethylene-acrylic acid copolymer, and an ethylene-acrylate-maleic anhydride terpolymer.

20. A process according to claim 17, wherein the starting resinis used in a mixture with at least one other polymer, wherein said at least one other polymer represents at most 50% by weight of the mixture.

21. A process according to claim 1, wherein the stable free radical or radicals, and, optionally, at least one radical-type polymerization introduced into:
- at least one molten zone of an extruder located at the outlet of the reactor for synthesis of the propylene homopolymer or copolymer, or
- at least one molten zone of an extruder that is used for repeat synthesis of the propylene homopolymer or copolymer, or
- another extruder in which all of the products that are to be incorporated into the formulation are fed into the extruder.

22. A process according to claim 21, wherein the resin in the viscous state and the stable radical or stable radicals, and, optionally, at least one radical-type polymerization trigger, and, optionally, one other polymer or polymers are brought into contact at a temperature of 100° C. to 350° C.

23. A process according to claim 22, wherein the resin in the viscous state and the stable radical or stable radicals, and, optionally, at least one radical-type polymerization trigger and, optionally, at least one other polymer, are brought into contact at a temperature of 160° C. to 250° C.

24. A process according to claim 21, wherein the resin in the viscous state and the stable radical or stable radicals, and, optionally, at least one radical-type polymerization trigger, and, optionally, at least one other polymer or polymers are brought into contact for a period of 10 seconds to 5 hours.

25. A process according to claim 24, wherein the resin in the viscous state and the stable radical or stable radicals, and, optionally, at least one radical-type polymerization trigger, and, optionally, at least one other polymer are brought into contact for a period of 10 seconds to 1 hour.

26. A process according to claim 21, wherein the stable free radical or radicals, and, optionally, at least one trigger are introduced into solution in a solvent.

27. A process according to claim 26, wherein trichlorobenzene is used as solvent.

28. A process according to claim 27, wherein the solution is introduced at an injection flow rate of 0.01–5% by weight of the total flow rate.

29. A process according to claim 1, wherein the stable radical or radicals, and, optionally, at least one polymerization trigger are introduced into the starting resin placed in a solvent medium at a temperature of 80° C. to 350° C.

30. A process according to claim 29, wherein the solvent is an aliphatic hydrocarbon, an cycloaliphatic, an aromatic hydrocarbon, or a halogenated hydrocarbon.

31. A process according to claim 1, wherein trigger is present for a temperature that is less than 200° C.

32. A process according to claim 1, wherein no trigger is present at a temperature above 200° C.

33. A process according to claim 3, wherein in the description of $R^9$ to $R^{12}$, said acid groups are —COOH, —PO(OH)$_2$ or —SO$_3$H.

34. A process according to claim 24, wherein the resin in the viscous state and the stable radical or stable radicals, and, optionally, at least one radical-type polymerization trigger, and, optionally, at least one other polymer or polymers are brought into contact for a period of 15 seconds to 1 minute.

* * * * *

UNITED STATES PATENT AND TRADEMARK OFFICE
CERTIFICATE OF CORRECTION

| | |
|---|---|
| PATENT NO. | : 6,620,892 B1 |
| DATED | : September 16, 2003 |
| INVENTOR(S) | : Bertin et al. |

It is certified that error appears in the above-identified patent and that said Letters Patent is hereby corrected as shown below:

Column 17,
Line 34, delete "-OR" and insert -- $OR^{16}$ --

Signed and Sealed this

Fourth Day of January, 2005

JON W. DUDAS
*Director of the United States Patent and Trademark Office*